(12) United States Patent
Bushell et al.

(10) Patent No.: US 11,055,217 B2
(45) Date of Patent: Jul. 6, 2021

(54) USING ADDITIONAL INTERMEDIATE BUFFER QUEUES TO IDENTIFY INTERLEAVED MEDIA DATA TO BE READ TOGETHER

(71) Applicant: Apple Inc., Cupertino, CA (US)

(72) Inventors: John Samuel Bushell, San Jose, CA (US); Mortiz Wittenhagen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 224 days.

(21) Appl. No.: 16/425,121

(22) Filed: May 29, 2019

(65) Prior Publication Data

US 2019/0370172 A1     Dec. 5, 2019

Related U.S. Application Data

(60) Provisional application No. 62/679,485, filed on Jun. 1, 2018.

(51) Int. Cl.
*G06F 12/06* (2006.01)
*G06F 3/06* (2006.01)

(52) U.S. Cl.
CPC ........ *G06F 12/0607* (2013.01); *G06F 3/0613* (2013.01); *G06F 3/0638* (2013.01); *G06F 3/0659* (2013.01); *G06F 3/0671* (2013.01)

(58) Field of Classification Search
None
See application file for complete search history.

(56) References Cited

U.S. PATENT DOCUMENTS

| 2008/0222640 | A1* | 9/2008 | Daly | G06F 9/4881 718/103 |
| 2008/0320254 | A1* | 12/2008 | Wingard | G06F 12/0607 711/157 |
| 2018/0329822 | A1* | 11/2018 | Brekelbaum | G06F 9/30043 |

* cited by examiner

*Primary Examiner* — Denise Tran
(74) *Attorney, Agent, or Firm* — BakerHostetler

(57) ABSTRACT

Techniques are disclosed for identifying multiple sections from one or more tracks of a media file and reading them together in a consumption-driven pipeline process. A render pipeline may comprise a sample generator, a sample buffer, and a destination buffer. Multiple render pipelines may be used for parsing multiple tracks of the media file. An I/O manager may determine that a destination buffer requires new data. The I/O manager may schedule a memory read for a data element from the sample buffer corresponding to the destination buffer and may determine if any of the sample buffers have data elements with memory locations close to the scheduled read. If so, the I/O manager may also schedule those memory locations to be read. After reading, the filled data elements corresponding to the read memory may then be sent to their corresponding destination buffers to be consumed and added to their corresponding tracks.

22 Claims, 4 Drawing Sheets

100

200

300

400

USING ADDITIONAL INTERMEDIATE BUFFER QUEUES TO IDENTIFY INTERLEAVED MEDIA DATA TO BE READ TOGETHER

CLAIM FOR PRIORITY

The present application benefits from priority of U.S. application Ser. No. 62/679,485, filed Jun. 1, 2018, and entitled "Using Additional Intermediate Buffer Queues to Identify Interleaved Media Data to be Read Together," the disclosure of which is incorporated herein in its entirety.

BACKGROUND

The present disclosure relates to memory access techniques for stored media.

Many consumer electronic devices render multimedia data. Such devices often store the multimedia data in a multimedia file, which may contain several tracks of information. A multimedia file may contain media tracks, such as one or more video tracks (e.g., tracks representing video content captured from different perspective views), one or more audio tracks (e.g., music tracks or tracks containing dialogs at different languages), one or more closed caption tracks (e.g., subtitles at different languages), and tracks for musical scores, among others. Often, it may occur that a subset of the tracks are selected for a rendering application, such as media playback or exporting. In such applications, a rendering device may review the multimedia file to: identify track(s) that are selected by the rendering application, read data from the file corresponding to these tracks, and process them as required by the application.

A rendering device may operate according to a render pipeline process. A render pipeline may possess a plurality of buffer queues corresponding to the tracks that are to be processed by the rendering operation. Each buffer queue contains identifiers of the locations within the media file from which data elements of the tracks (namely, "samples") are to be retrieved. A memory access manager reads content of the buffer queues and initiates a memory read access to retrieve samples from memory. Once samples are retrieved, they may be forwarded to processing elements associated with the samples' respective tracks.

Multimedia files tend to be quite large. Inefficiencies in memory access can provide significant impairments to rendering applications.

DETAILED DESCRIPTION

Aspects of the present disclosures provide techniques for grouping reads of one or more media tracks in a consumption-driven pipeline process. Reading multiple groups of data together provides several advantages. Tracks may typically be contemporaneously associated with each other and located closely in storage for easier processing, so grouping reads is more efficient in using processing resources than reading each group of data separately. Grouping reads also minimizes the extent to which portions of a media file are read more than once. Additionally, I/O entities are typically the slowest entities in a computer system, and multiple I/O accesses may bottleneck other processes. Therefore, grouping reads is also more efficient in terms of processing time.

Figure 1:
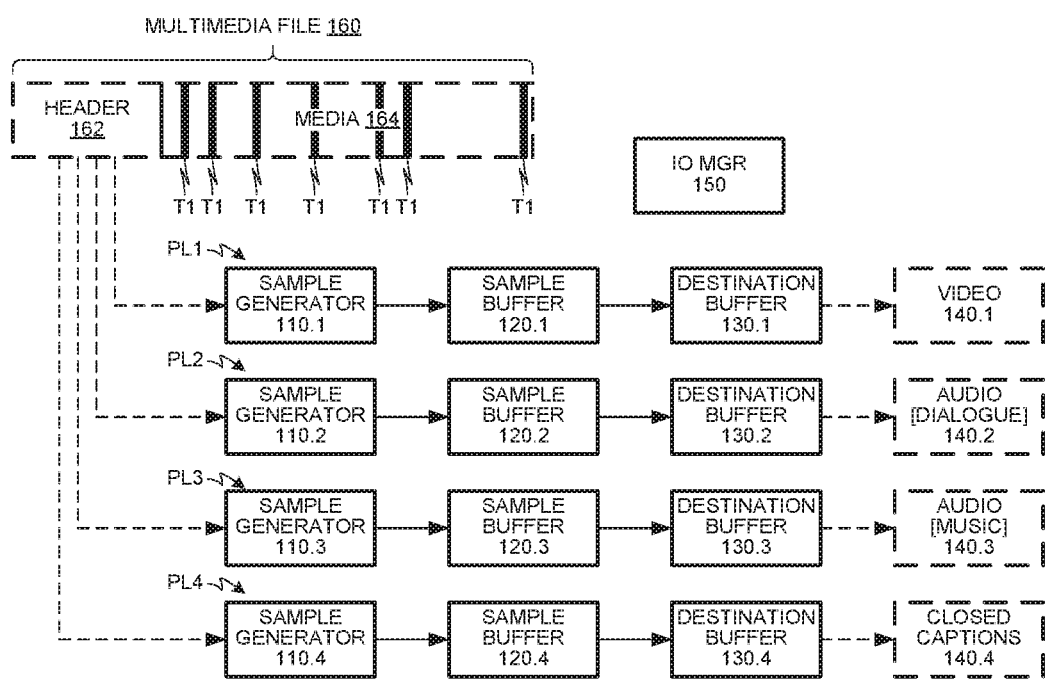
FIG. 1 is a functional block diagram of a media export system according to an aspect of the present disclosures.

FIG. 1 is a functional block diagram of a system 100 according to an aspect of the present disclosure. The system 100 may include a plurality of rendering pipelines PL1-PL4 that include a sample generator 110.1, . . . 110.4, sample buffers 120.1, . . . , 120.4, a destination buffer 130.1, . . . , 130.4. The system 100 also may include an input/output (I/O) manager 150. The sample generators 110.1, . . . , 110.4 each may review header information in a multimedia file to identify locations within the multimedia file 160 from which samples associated with the sample generators' respective track are located. The sample buffers 120.1, . . . , 120.4 each may store buffer entries representing locations from the file where samples for each track are to be read. The destination buffers 130.1, . . . , 130.4 each may store buffer entries that contain track samples having been read from the multimedia file. The I/O manager 150 may manage read operations that read samples from the multimedia file 160.

Four render pipelines are shown in the example of FIG. 1, corresponding to four tracks 140 of a multimedia file 160: a video track 140.1, an audio dialogue track 140.2, an audio music track 140.3, and a closed caption track 140.4. In practice, however, the number of render pipelines and the types of media that they process will be determined by the rendering application for which the system 100 is used.

FIG. 1 illustrates a structure of an exemplary multimedia file 160 with which the system 100 may operate. A multimedia file 160 typically includes a header section 162 that identifies the various tracks that are available in the multimedia file, and the locations within the file where samples of the respective tracks are located. The file 160 also may include a media section 164 that contains the samples of the different tracks. In the example of FIG. 1, the media section is shown as having samples corresponding to a track T1, which are located at various positions within the file 160. Samples of the other tracks are not shown but they are interspersed within the media section 164 among the samples of track T1.

As discussed, each pipeline P1-P4 may have a sample generator 110.1, . . . , 110.4 associated with it. The sample generators 110.1-110.4 may review the header information 162 of the multimedia file 160 and may identify locations within the file 160 where samples of the generator's respective track are to be found. For each location in the file that contains a set of samples for its track, a sample generator, e.g., 110.1, may generate a data entry (a data element) in its corresponding sample buffer 120.1. The sample generator 110 may identify memory locations of the samples in system memory (not shown) of the device on which the system 100 operates. The sample generator 110.1 may create a data entry in its sample buffer 120.1 that identifies the sample's location.

Each pipeline P1-P4 also may have a sample buffer 120.1, . . . , 120.4 associated with it. Each sample buffer (say, 120.1) may contain data elements that identify locations in system memory where samples corresponding to the pipeline's track may be retrieved. The sample buffers 120.1, . . . , 120.4 may queue the received data elements until they are scheduled by the I/O manager 150.

Each pipeline P1-P4 also may have an associated destination buffer 130.1, . . . , 130.4. The destination buffer 130 may queue the data elements from the sample buffer 120.1, . . . , 120.4 after the samples are read from memory. Each destination buffer 130.1, . . . , 130.4 may queue the filled data elements until they exit the respective pipeline P1, . . . , P4 for processing.

The I/O manager 150 may read memory locations from the multimedia file 160. The I/O manager 150 may identify a span of memory from which to read samples from the data elements that are queued by the sample buffers 120.1-120.4 and/or destination buffers 130.1-130.4. In an aspect, the I/O manager 150 may review queued data elements from across the different pipelines P1-P4 to optimize memory accesses. When the I/O manager 150 reads data into system memory, it may place data into one or more queued buffer entries in the sample buffers 120.1-120.4 and/or destination buffers 130.1-130.4. In an aspect, the I/O manager 150 may place read data into a buffer separate from the sample buffers 120.1-120.4 and the destination buffers 130.1-130.4 before the data is processed and/or placed.

In an aspect, the I/O manager 150 reads may be triggered by an indication that a destination buffer 130.1, . . . , 130.4 requires new data. Some rendering applications, such as media export applications, are consumption-driven, which may cause the various destination buffers 130.1-130.4 to drain data at different rates. Therefore, the destination buffers 130.1-130.4 may reach low data levels (or become empty) at different times. When the I/O manager 150 receives an indication that a destination buffer (say, buffer 130.1) requires new data, it may schedule a memory read for a data element from a corresponding sample buffer 120.1. The I/O manager 150 may determine if the sample buffers 120.1-120.4 have queued data elements that refer to other memory locations near to the memory location to which the scheduled read will occur. If so, the I/O manager 150 may perform a read operation that reads a sufficient quantity of data to provide data for multiple queued data elements.

The techniques proposed herein may be applied with a variety of media sources suitable for pipeline processing, including, for example, multimedia files 160, audio files, and other types of media files having more than one track that may be processed in parallel. The proposed techniques may also be used with any suitable means for transmitting data between buffers and processing entities, such as a wire conduit, a wireless antenna system, or an electronic circuit. In example aspects, data transmission may be performed via a one or more circuits on a processor or bus. Data transmission may also be performed via a wired connection, such as an Ethernet cable. Data transmission may also be performed via a wireless connection, such as WiFi, Bluetooth, or Airplay. The types of media sources and means for data transmission are immaterial to the present discussion unless described herein.

Figure 2:
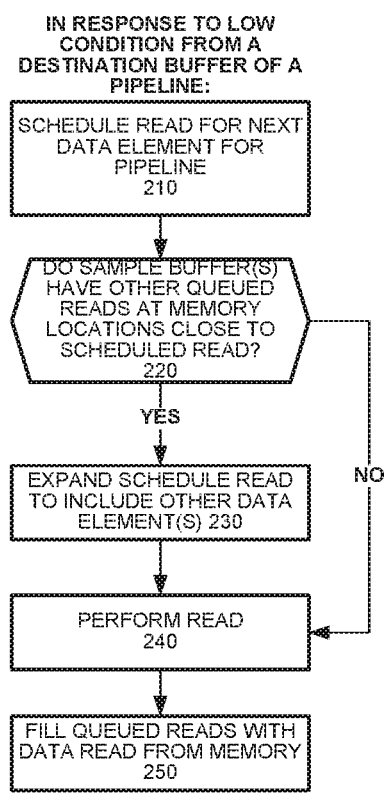
FIG. 2 illustrates a method according to an aspect of the present disclosures.

FIG. 2 illustrates a method 200 according to an aspect of the present disclosure. The method 200 may include filling multiple data elements using a single read access to a media file in a consumption-driven pipeline. The method 200 may be triggered in response to a low condition from a destination buffer. The method 200 may begin by scheduling a read from a sample buffer corresponding to the low destination buffer (block 210). The method 200 may determine whether any of the sample buffers have other queued reads that refer to memory locations that are close to the scheduled read (block 220). If there are reads for other data elements that may be performed close to the scheduled read for the initial data element, the method may modify the scheduled read operation to include the locations for the other data element(s) (block 230). The method 200 may then perform the scheduled reads, including the initially scheduled read and any additional scheduled reads (block 240). Reading the scheduled memory locations may occur during a single access to the media file. The method 200 may then fill data elements from the sample buffers with their respective data read from the media file (block 250). In aspects, the method 200 may be performed until the entirety of each track of the media file is read.

In aspects, a state of low condition in a destination buffer may be determined by one or more entities associated with writing to the destination buffer, one or more entities associated with reading from the destination buffer, one or more entities associated with monitoring the destination buffer(s), or a combination of such entities. For example, a processing entity, such as an I/O manager as described in FIG. 1 or a file writer or a queue manager, may be configured to search a destination buffer queue and/or ascertain the size of a destination buffer queue to determine how much data is in one or more destination buffers. Based on such a search or size determination, the processing entity may be able to determine which destination buffers are low. The processing entity may also be able to determine an order in which each destination buffer will need data, e.g., a size ranking of each destination buffer from smallest to largest or vice versa. In aspects, a file writer or queue manager may notify an I/O manager that a destination buffer is low. A low condition may be determined based on a pre-determined threshold associated with a certain destination buffer~low condition state then may be flagged when not meeting a threshold amount of data that should be present in a destination buffer. A state of low condition may also be determined based on the destination buffer size not meeting a threshold size. Such thresholds may be configured by a processing entity, such as an I/O manager or file writer or queue manager, or by a user, such as a system administrator.

In an aspect, the initial read may be scheduled for a memory location associated with a next data element of the sample buffer corresponding to the low condition destination buffer. For example, the next data element of the sample buffer may correspond to memory location M, so a read may be scheduled for memory location M. If there is not yet a next data element present, the method 200 may need to wait for a data element to be queued at the sample buffer.

In an aspect, sample buffers may be searched to determine which data elements are queued. For example, a processing entity, such as an I/O manager as described in FIG. 1, may search each sample buffer to find queued data elements. In another aspect, sample buffers may indicate to a processing entity which data elements are queued. For example, sample buffers may be governed by one or more processing entities that may send one or more tables or lists of queued data elements to an I/O manager to schedule for reading. After the data elements are ascertained, their respective memory locations may be determined, and it may be determined which, if any, of these memory locations are close to the memory location of the scheduled read. In an aspect, processing entities governing the sample buffers may be able to determine and/or store a table or list of which data elements have associated memory locations close to one another. Such a table or list may then be sent to an I/O manager for scheduling the reads.

Figure 3:
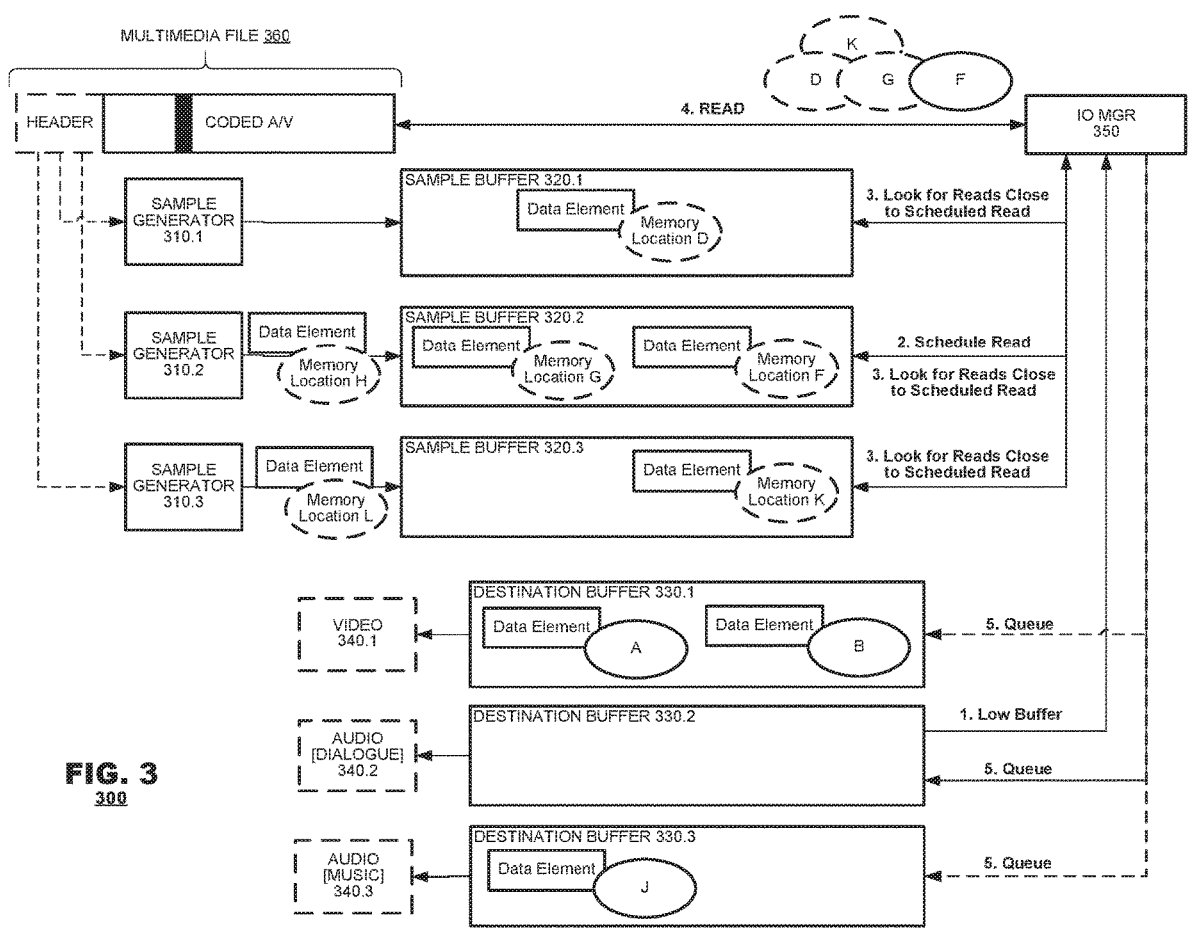
FIG. 3 is a functional block diagram of a media export system according to an aspect of the present disclosures.

FIG. 3 is a functional block diagram of the lifecycle of a movie export system 300 for grouping reads in a consumption-driven pipeline process according aspects of the present disclosures. The system 300 may include a plurality of sample generators 310, a plurality of sample buffers 320, a plurality of destination buffers 330, and an input/output (I/O)

manager 350. The sample generators 310, sample buffers 320, and destination buffers 330 together create render pipelines for reading tracks 340 of a multimedia file 360 and writing the tracks 340 to a destination file. Three render pipelines are shown in FIG. 3, corresponding to three tracks 340 of a multimedia file 360: a video track 340.1, an audio dialogue track 340.2, and an audio music track 340.3. Each render pipeline is denoted by components with the same decimal point, e.g., sample generator 310.1, sample buffer 320.1, and destination buffer 330.1 belong to the same render pipeline.

As shown, each sample generator 310 may create a data element for a parsed memory location of its respective track 340. The data element may then be queued in a corresponding sample buffer 320. As shown in FIG. 3, the sample generator 310.2 has recently parsed memory location H from the multimedia file 360 and created a data element for this memory location. Similarly, the sample generator 310.3 has recently parsed memory location L and created a respective data element.

A data element may be sent to a sample buffer 320 associated with the sample generator 310 it originated from. A sample buffer 320 may queue the received data elements and wait for them to be scheduled and read. As shown in FIG. 3, the sample buffer 320.1 has received a data element for memory location D. The sample buffer 320.2 has received data elements for memory locations F and G and will next receive the data element for memory location H. The sample buffer 320.3 has received a data element for memory location K and will next receive the data element for memory location L.

A destination buffer 330 may receive one or more data elements filled with memory read from its respective track of the multimedia file 360. A filled data element may then be read or written from the destination buffer 330 to its corresponding track of the destination file. As shown in FIG. 3, the destination buffer 330.1 has received data elements filled with data from memory locations A and B, which will then be written to the video track 340.1. The destination buffer 330.2 is empty because all of its data has been written to the audio dialogue track 340.2. The destination buffer 330.3 has received a data element filled with data from memory location J, which will be written to the audio music track 340.3.

The I/O manager 350 may read memory locations from the multimedia file 360. The I/O manager 350 may receive a data element having an associated memory location from one of the sample buffers 320. The I/O manager 350 may then read the memory location from the multimedia file 360 and fill the data element with the memory read from that memory location. The I/O manager 350 may queue the filled data element with the destination buffer 330 corresponding to the sample buffer 320 from which the data element originated. In FIG. 3, data elements corresponding to memory locations that have not yet been read are shown as dashed ovals, such as the data elements associated with memory locations D, F, G, H, K, and L, queued or soon to be queued in sample buffers 330.1-3. Filled data elements are shown as solid ovals, such as the data elements associated with memory locations A, B, and J queued in the destination buffers 330.1 and 330.3.

In an aspect, similarly to FIG. 1, the sample generators 310 may parse memory locations from a header or other metadata of a media file. For example, a multimedia file 360 may include coded audio and video and a header. The header may hold information indicating memory locations storing the tracks 340.1-3 of the multimedia file 360. A sample generator 310 may use this header information to determine memory locations to parse from its respective media track. The sample generator 310 may then queue parsed information, as described above. As shown in FIG. 3, the sample generator 310.2 has parsed memory location H from the audio dialogue track 340.2 of the multimedia file 360, and the sample generator 310.3 has parsed memory location L from the audio music track 340.3 of the multimedia file 360.

In an aspect, the I/O manager 350 may determine that a destination buffer 330 requires new data, as described above. As shown in FIG. 3, the I/O manager 350 may determine that the destination buffer 330.2 is empty ("low buffer") and requires new data. In response, the I/O manager 350 may schedule a memory read for a data element from the sample buffer 320 corresponding to the low destination buffer 330. In FIG. 3, the sample buffer 320.2 corresponds to the low destination buffer 330.2, so the I/O manager 350 schedules a read for the memory location associated with next data element of the sample buffer 320.2, memory location F.

In an aspect, the I/O manager 350 may then determine if any of the sample buffers 320.1, . . . , 320.3 have data elements with memory locations close to memory location F. In FIG. 3, the I/O manager 350 may determine whether memory locations G, K, and/or D are close to memory location F. Note that the data elements of such memory locations may be considered in any order. If the I/O manager 350 determines that any of memory locations G, K, or D are close to memory location F (e.g., within a selected or predetermined distance from the memory location F), the I/O manager 350 may also schedule those memory locations to be read. Whether memory locations G, K, or D are close to memory location F may be determined based on whether the associated data elements are located within a predetermined memory segment; alternatively, it may be determined based on whether the associated data elements may be read via a single memory access to the multimedia file 360. The I/O manager 350 may then read the scheduled memory locations from the multimedia file 360. Reading the scheduled memory locations may occur during a single access to the multimedia file 360. As shown in FIG. 3, the I/O manager 350 has read at least memory location F. The I/O manager 350 may fill the one or more data elements with the read memory and queue the filled data elements at their respective destination buffers 330. Data read from the memory locations may be stored in a buffer, separate from a sample buffer 320 and a destination buffer 330, before filling the data elements. The filled data elements may then be consumed and added to their corresponding tracks 340.

It should be appreciated that the described techniques keep the separation of individual pipelines intact. A pipeline does not need to coordinate directly with any other pipeline to perform the grouping of reads. The grouping is achieved using the typical layout of media files and the implicit connection of the render pipelines with respect to a presentation timeline, as explained above.

Figure 4:
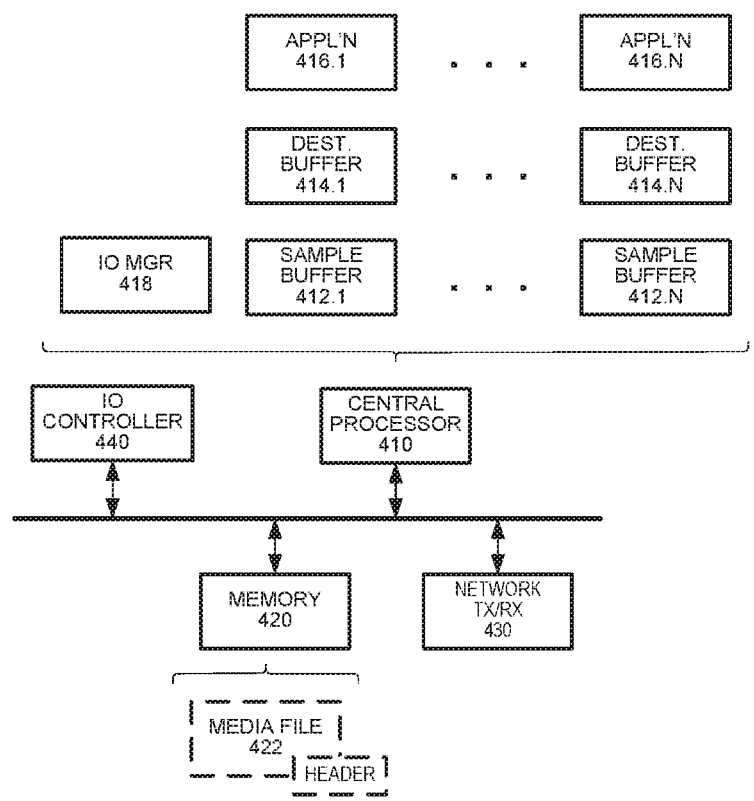
FIG. 4 is a block diagram of an exemplary video source according to an aspect of the present disclosures.

FIG. 4 is a block diagram of an exemplary computing device 400, according to an aspect of the present disclosure. The computing device 400 may include a central processor 410, a memory 420, a network transceiver 430, and an input/output (I/O) controller 440 provided in communication with one another. The computing device 400 may be used as a processing entity, such as those described in the above aspects.

The central processor 410 may read and execute various program instructions stored in the memory 420 that define various applications 416.1-416.N, sample buffers 412.1-412.N, destination buffers 414.1-414.N, an I/O manager 418, and/or one or more file writers and queue managers (not shown). The program instructions may cause the central processor 410 to perform the methods described hereinabove to group reads in a consumption-driven pipeline process and to drive media tracks of a media file 422 to a destination file. It should be appreciated that the program instructions may be located on and executed by more than one computing device 400 to perform the methods described above. For example, one computing device 400 may store program instructions to define and execute processes associated with the sample buffers 412.1-412.N and the destination buffers 414.1-414.N, and another computing device 400 may store program instructions to define and execute processes associated with the I/O manager 418. The memory 420 may store the program instructions on electrical-, magnetic- and/or optically-based storage media.

The memory 420 may also store the media file 422. The media file 422 may have associated metadata, such as a header, as described above. Once media tracks of the media file 422 are written to a destination file, the destination file may be stored in the memory 420 or may be output via the I/O controller 440.

The I/O controller 440 may receive and process input from a number of input devices, such as a keyboard, a mouse, a touchpad, a touch screen, an electronic stylus, or other type of input device. Similarly, the I/O controller 440 may provide output to a display, such as a computer monitor, a flat-panel display, a digital projector, a printer, a plotter, or other type of output device.

The network transceiver (TX/RX) 430 may interface the computing device 400 to other devices via a network connection (not shown). The network transceiver 440 may generate signals on the network that conform to governing protocol(s) on which the network operates to send and receive data from other devices. The computing device 400 may use the network transceiver 440 to download one or more media files 422 from various sources (not shown), for example, on the Internet.

Several aspects of the present disclosure are specifically illustrated and described herein. However, it will be appreciated that modifications and variations of the present disclosure are covered by the above teachings and within the purview of the appended claims without departing from the spirit and intended scope of the disclosure.

We claim:

1. A method for reading data of a multimedia file according to a plurality of pipelines, comprising:
   when a pipeline of one track is determined to be low, scheduling a read operation of a next data element for the one track to be read, the read operation referring to a first location within a memory device;
   determining, from queued read operations of the plurality of pipelines, whether there are other queued read operations that refer to memory locations within a selected distance of the first location;
   when there are other queued read operations that refer to memory locations within the selected distance of the first location, expanding the scheduled read operation to include the memory locations; and
   reading data from the memory device according to the scheduled read operation.

2. The method of claim 1, wherein the reading data is reading into a buffer before filling one or more data elements.

3. The method of claim 1, further comprising filling data elements with the data read from the memory device.

4. The method of claim 3, further comprising, when a data element is filled, queueing the filled data element at a destination buffer associated with queue of memory locations from which the read memory location originated.

5. The method of claim 1, further comprising:
   writing data read from a memory location to a track of the multimedia file, wherein the track is determined based on the pipeline from which the memory location originated.

6. The method of claim 1, wherein the determining whether there are other queued read operations that refer to memory locations within a selected distance of the first location comprises:
   receiving a list of queued read operations; and
   searching the list for the memory locations that are within the selected distance of the first location.

7. The method of claim 1, wherein the determining whether there are other queued read operations that refer to memory locations within a selected distance of the first location comprises:
   receiving a list of queued read operations that are close to one another; and
   determining, from the list, the memory locations that are within the selected distance of the first location.

8. The method of claim 1, wherein the determining whether there are other queued read operations that refer to memory locations within a selected distance of the first location comprises:
   searching the pipeline of the one track for the memory locations that are within the selected distance of the first memory location; and
   searching the rest of the pipelines for the memory locations that are within the selected distance of the first memory location.

9. The method of claim 1, wherein determining the pipeline of the one track is low comprises:
   searching a destination buffer of the pipeline to determine an amount of data in the destination buffer; and
   determining the amount of data does not meet a threshold amount of data.

10. The method of claim 9, wherein the threshold amount of data is configured by a user.

11. The method of claim 9, wherein the threshold amount of data is configured by a processing entity.

12. The method of claim 1, wherein determining the pipeline of the one track is low comprises:
    determining a size of a destination buffer of the pipeline; and
    determining the size of the destination buffer does not meet a threshold size.

13. The method of claim 12, wherein the threshold size is configured by a user.

14. The method of claim 12, wherein the threshold size is configured by a processing entity.

15. The method of claim 1, wherein determining the pipeline of the one track is low comprises:
    determining a size ranking of destination buffers of the plurality of pipelines; and
    selecting the smallest destination buffer.

16. The method of claim 1, wherein determining the pipeline of the one track is low comprises:
    receiving a notification that a destination buffer of the pipeline is low.

17. The method of claim 1, wherein the multimedia file comprises a plurality of media tracks.

18. The method of claim 17, wherein the plurality of media tracks comprise one or more of a video track, an audio dialogue track, and an audio music track.

19. The method of claim 18, wherein the plurality of media tracks further comprise a closed caption track.

20. A media access system comprising:
- a plurality of pipelines, each corresponding to a respective track of a multimedia file, each comprising:
  - a sample generator for parsing memory locations of the multimedia file that contain the respective track;
  - a sample buffer to store data elements to be read by read operations, the data elements corresponding to the memory locations; and
  - a destination buffer to store track samples read by the read operations, the track samples corresponding to the data elements stored by the sample buffer; and
- an input/output (I/O) manager, responsive to a low data indication from a destination buffer of one of the plurality of pipelines, to:
  - schedule a read operation of a next data element for the respective track to be read of the one pipeline, the read operation referring to a first location within a memory device;
  - determine, from queued read operations of the plurality of pipelines, whether there are other queued read operations that refer to memory locations within a selected distance of the first location;
  - when there are other queued read operations that refer to memory locations within the selected distance of the first location, expand the scheduled read operation to include the memory locations; and
  - read data from the memory device according to the scheduled read operation.

21. The system of claim 20, wherein the I/O manager fills data elements with data read from the memory location.

22. A non-transitory computer readable medium storing program instructions that, when executed by a processing device, cause the device to execute a method, comprising:
- for each of a plurality of pipelines to read a respective track of a multimedia file, when a pipeline of one track is determined to be low, scheduling a read operation of a next data element for the one track to be read, the read operation referring to a first location within a memory device;
- determining, from queued read operations of the plurality of pipelines, whether there are other queued read operations that refer to memory locations within a selected distance of the first location;
- when there are other queued read operations that refer to memory locations within the selected distance of the first location, expanding the scheduled read operation to include the memory locations; and
- reading data from the memory device according to the scheduled read operation.

* * * * *